3,647,707
ALKALI MONOSULFIDE RECRYSTALLIZATION OF LANTHANIDE OXYSULFIDE LUMINESCENT MATERIAL
George R. Gillooly, Cleveland Heights, and Jacob G. Rabatin, Chardon, Ohio, assignors to General Electric Company
No Drawing. Filed Sept. 8, 1969, Ser. No. 856,153
Int. Cl. C09k 1/14
U.S. Cl. 252—301.4 S 4 Claims

ABSTRACT OF THE DISCLOSURE $Y_2O_2S$:Eu or related luminescent materials are recrystallized in liquid $Na_2S$ or other alkali monosulfides to increase particle size and improve crystallinity and light production of the luminescent material. The starting material is preferably prepared by firing europium-containing $Y_2O_3$ or related oxides in $H_2S$ gas.

BACKGROUND OF THE INVENTION

The present invention relates to a process for treating luminescent materials. More particularly, it relates to a process for treating particulate activated lanthanide oxysulfide luminescent materials to recrystallize them and improve their operating characteristics.

Lanthanide oxysulfide luminescent materials such as $Y_2O_2S$:Eu (yttrium oxysulfide activated with europium) have previously been produced by various processes, and, generally, by single step processes. For instance, compounds of the constituent materials have been mixed together with mineralizing agents such as other compounds which produce an alkali metal sulfide and a polysulfide upon heating. Specifically, such mineralizing agents have included alkali thiosulfate and a mixture of sulfur and alkali carbonate. However, the processes of the prior art have tended to produce $Y_2O_2S$:Eu mixed with a variety of residual compounds, some of which are deleterious, and none of which are desired, being at least wasteful diluents. Also, these undesired reaction products are often difficult to remove from the luminescent material or phosphor. Particularly, undesirable contaminants include unreacted $Y_2O_3$, $Y_2S_3$, $NaYS_2$, and polymeric sulfides of sodium.

Furthermore, prior art processes have not resulted in the desired degree of crystallinity or large enough particles for optimum application. Likewise, improvements in brightness of such phosphors are always desirable.

SUMMARY OF THE INVENTION

It is an object of the present invention to provide a process for improving the luminescent characteristics and applicability of lanthanide oxysulfide luminescent materials. A further object is to accomplish such ends by recrystallizing such materials to improve their crystallinity and brightness and to increase their particle sizes.

Briefly stated, the present invention in certain of its embodiments provides a process for treating particulate lanthanide oxysulfide materials activated for luminescence and selected from the oxysulfides of Y, La and Gd activated with lanthanides selected from Dy, Er, Eu, Ho, Nd, Pr, Sm, Tb and Tm wherein said materials are recrystallized in liquid alkali monosulfide at temperatures in the range of about 1000 to 1300° C. for a time sufficient to increase the size and crystallinity of the particles of said material.

Particular embodiments of the invention include such processes utilizing $Na_2S$ for recrystallizing $Y_2O_2S$:Eu phosphor, and the use of the process of the invention with lanthanide oxysulfide materials that have been prepared by reacting the appropriate lanthanide oxides with $H_2S$ in a temperature range of about 700 to 1600° C.

DESCRIPTION OF THE PREFERRED EMBODIMENTS

In the present invention, alkali sulfides including $K_2S$, $Li_2S$ and $Na_2S$ and mixtures thereof are used in molten form as a bath for the recrystallization of lanthanide oxysulfide luminescent materials including $Gd_2O_2S$:Eu, $La_2O_2S$:Tb, $La_2O_2S$:Eu, and $Y_2O_2S$:Eu. As in conventional phosphor nomenclature, the element or elements identified after the colon is the activator. Unless indicated otherwise, the activator is incorporated in the host lattice in partial substitution for one of the constituents. In these cases, the lanthanide activator substitutes for proportional quantities of the lanthanide of the oxysulfide host. For instance, such a phosphor containing 5% Eu as an activator would have the Eu substituted for 5% of the La. Suitable activators for various purposes for such oxysulfide phosphors can be selected from the lanthanides including Dy, Er, Eu, Ho, Nn, Pr, Sm, Tb, and Tm. Activator contents, measured as $x$ in accordance with the formula

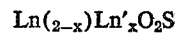
$$\text{Ln}_{(2-x)}\text{Ln}'_x\text{O}_2\text{S}$$

wherein Ln is one or more of Y, Gd, and La, and Ln' is one or more of Dy, Er, Eu, Ho, Nd, Pr, Sm, Tb and Tm, can range at least from 0.0002 to 0.2 with about 0.03 to 0.05 being preferred.

Because of the commercial interest in $Y_2O_2S$:Eu, detailed examples will be given of the application of the invention primarily to that phosphor. The following exemplary description includes the production of the initial $Y_2O_2S$:Eu phosphor as well as its recrystallization.

The oxides of yttrium and europium are slurried in water, then dissolved by addition of $HNO_3$ and boiling for several minutes. The solution is cooled to about 50° C. and oxalic acid is added as a 10% solution in amounts such as 120 to 200% of the stoichiometric amount, preferably about 120%, and the reaction mixture is stirred for about 5 minutes during which time the oxalates of yttrium and europium are coprecipitated. The coprecipitated oxalates are removed by filtration, then dried at about 110° in air and then fired to the oxide in air for about one hour at about 1100° C. This gives the mixed yttrium oxide and activator in a form suitable for use in production of $Y_2O_2S$:Eu.

More specifically, 10.80 grams of 99.9% $Y_2O_3$ are dissolved with 0.79 grams of 99.9% $Eu_2O_3$, coprecipitated with 22.7 grams of $H_2C_2O_4 \cdot 2H_2O$, dried and fired to the oxides as described above. The ignited oxide is subsequently placed in an open dish and fired in an atmosphere of flowing $H_2S$ at temperatures between 700 and 1600° C., normally about 900° C. The amount of $H_2S$ will usually be about twice the theoretical amount for conversion of the oxide to the oxysulfide, depending on furnace geometry and construction.

Ten grams of the prepared oxysulfide is then mixed with between one to five grams of 60% $Na_2S$ hydrated flake, preferably about three grams. This mixture is then fired in a stream of pure nitrogen between 1100 to 1300° C., preferably about 1160° C. for about 1 to 2 hours or longer for larger samples. Reaction vessels can be provided made of fused silica, or, in some circumstances, preferably alumina.

The resulting fired mixture of recrystallized yttrium oxysulfide phosphor and sodium sulfide is cooled in nitrogen, crushed, and repeatedly washed in water sufficient to remove the sodium sulfide.

Similar processes can be used to prepare other embodiments of the invention.

$Li_2S$, $K_2S$, or mixtures of either with each other or with $Na_2S$ can be used as the flux in the same molar proportions as the $Na_2S$. With these other fluxes, somewhat different recrystallization temperatures can be used. For example, 1250° C. has been used successfully with $Li_2S$ and $K_2S$ fluxes.

For the production of oxysulfides of the other lanthanides used, compounds of Gd or La can be substituted for the compounds of Y, with appropriate adjustments known in the art made in the weight of the ingredients to maintain the molar proportions, and similar known adjustments can be made in the ingredients to obtain the desired activators.

What we claim as new and desire to secure by Letters Patent of the United States is:

1. A process for treating particulate lanthanide oxysulfide materials activated for luminescence and selected from the oxysulfides of Y, La and Gd activated with lanthanides selected from Dy, Er, Eu Ho, Nd, Pr. Sm, Tb and Tm, wherein said materials are recrystallized in a flux consisting of liquid alkali monosulfide at temperatures in the range of about 1000 to 1300° C. for a time sufficient to increase the size and crystallinity of the particles of said material.

2. A process according to claim 1 in which said lanthanide oxysulfide is $Y_2O_2S$ activated wtih europium.

3. A process according to claim 1 in which said akali sulfide is $Na_2S$.

4. A process according to claim 1 in which said lanthanide oxysulfide is $Y_2O_2S$ activated with europium and said alkali sulfide is $Na_2S$.

References Cited

UNITED STATES PATENTS 3,502,590   3/1970   Royce et al. _____ 252—301.4 S

ROBERT D. EDMONDS, Primary Examiner